United States Patent [19]

Smith

[11] 4,192,515

[45] Mar. 11, 1980

[54] GASKET RETAINING SPRING

[75] Inventor: Hosea E. Smith, Baytown, Tex.

[73] Assignee: Exxon Research & Engineering Co., Florham Park, N.J.

[21] Appl. No.: 912,892

[22] Filed: Jun. 5, 1978

[51] Int. Cl.² .................. F16J 15/06; F16L 23/02
[52] U.S. Cl. .................................................. 277/11
[58] Field of Search ................. 277/9, 11, 204, 915

[56] References Cited

U.S. PATENT DOCUMENTS

| | | | |
|---|---|---|---|
| 949,658 | 2/1910 | Randall | 277/11 |
| 2,339,478 | 1/1944 | Hoheisel | 277/204 |
| 2,462,762 | 2/1949 | Nardin | 277/11 |

*Primary Examiner*—Robert I. Smith
*Attorney, Agent, or Firm*—James E. Reed; David A. Roth

[57] ABSTRACT

Gaskets used in flanged assemblies containing gasket recesses are held in place during the makeup of such assemblies by means of metallic springs which are attached to the wall of the recess adjacent the edge of the gasket and, when the gasket is properly positioned, bear against the edge with sufficient force to hold the gasket in place.

4 Claims, 6 Drawing Figures

GASKET RETAINING SPRING

BACKGROUND OF THE INVENTION

1. Field of the Invention

This invention relates to flanged connections for process equipment and is particularly concerned with an improved system for retaining gaskets in the proper position during the makeup of such connections.

2. Description of the Prior Art

Flanged connections are used on process equipment of many different types, particularly large diameter vessels designed for operation at elevated temperature and pressure. Such connections normally require the use of a gasket between the machined faces of two flanged members to effect a seal. On heat exchangers and similar large diameter vessels, one of the flanged members generally contains an annular recess into which the gasket is placed. The flanged member adjacent that containing the recess normally includes a corresponding raised section or land which extends into the recess and contacts the gasket. A continuing problem with equipment of this type is that of keeping the gasket in the proper position while the connection is being made up, particularly where the faces of the flanged members and the gasket extend along vertical planes. The gasket normally tends to drop to the bottom of the recess and may fall out before the bolts can be tightened sufficiently to hold it in place. In many instances, the positioning of the flanged members must be done under conditions such that the gasket cannot be seen and the fact that it is not properly positioned is not discovered as the connection is being made up. This often results in leakage of the connection, necessitating that it be dismantled and made up again with a new gasket. If the improperly made up joint is not discovered during testing, it can lead to failure of the equipment and injury to personnel.

There have been many approaches to the problem of keeping gaskets in place during the makeup of flanged connections. One of the most common methods has been to apply grease to the gasket to hold it in place. This works reasonably well if enough grease is used but may result in leakage if the joint is heated during service and the grease melts. Adhesive tape has also been used to hold the gasket in place but this results in imbedding of the tape in the gasket when the connection is tightened and will again result in leakage when the tape disintegrates after the equipment has been put into service. Various types of retainers intended to extend through the bolt holes have been proposed but these are generally useful only with full face gaskets and cannot be used with flanged connections of the type referred to above. No wholly satisfactory method for properly positioning gaskets of this type has been available heretofore.

SUMMARY OF THE INVENTION

This invention provides an improved method and apparatus for the positioning of gaskets during the makeup of flanged connections which at least in part eliminates the difficulties outlined above. In accordance with the invention, it has now been found that gaskets can be readily held in place during flange makeup operations by attaching a plurality of small metallic springs to the flanged member adjacent the gasket recess, each spring engaging the edge of the gasket within the recess and bearing against it with sufficient force to hold the gasket in place. The springs keep the gasket centered in the recess and prevent it from slipping out of place as the other flanged member is moved into position and the connection is made up. The springs are left in place on the gasket and because of their small size normally have no detrimental effect upon its service life.

The springs employed for purposes of the invention may be either flat or bowed metallic strips or bent wire members shaped to engage the edge of the gasket within the recess and bear against it. If metallic strips are used, each strip will normally be made of thin stainless steel, brass or similar metal on the order of from about 0.01 to about 0.05 inch or more in thickness and will generally be from about one-half to about 2 inches or more in length, depending upon the size of the gasket and the size of the flange recess in which it is to be used. The width of each spring will generally be about the same as the thickness of the gasket. The strips will preferably be tack welded to the wall of the recess adjacent the edge of the gasket but may be attached in other ways if desired. It is generally preferred to provide a short tab or projection at the end of each strip near the outer edge to extend over the edge of the gasket and aid in holding it in place. If wire springs are used in lieu of metallic strips, each spring can be bent to provide the shape required for engaging the edge of the gasket. The dimensions and configurations selected for a particular application will depend in part upon the dimensions of the gasket and gasket recess with which the springs are to be used and may be varied as necessary. The springs will normally be spaced at regular intervals about the periphery of the gasket recess.

The invention provides a simple and low cost method for holding gaskets in place which facilitates the centering of gaskets within the gasket recesses of flanged members, prevents the gaskets from slipping or falling out during positioning and makeup of the flanged members, has no appreciable adverse effect on gasket life, does not require the temporary placement of retaining devices in the bolt holes of the flanged members during makeup operations, and does not necessitate any significant departure from the methods normally used for positioning and making up the members. As a result, the method and apparatus of the invention may have widespread application in the installation and maintenance of heat exchangers, reactors, pumps, and other process equipment.

DESCRIPTION OF THE PREFERRED EMBODIMENTS

Figure 1:
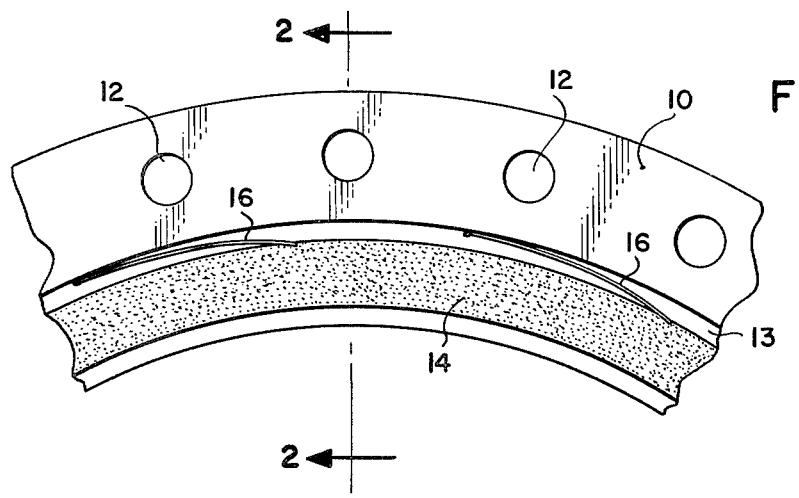
FIG. 1 in the drawing is a fragmentary view of a flanged member illustrating the use of the springs of the invention to hold a gasket in place within the gasket recess of the member.
Figure 2:
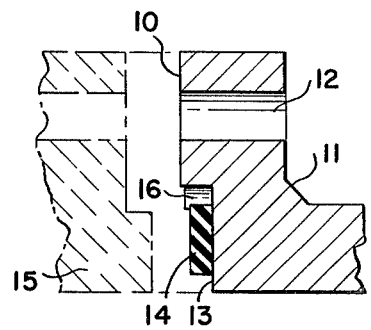
FIG. 2 is an enlarged cross-sectional view of the apparatus of FIG. 1 taken about the line 2—2.

FIGS. 1 and 2 in the drawing are fragmentary views of a flanged connection for a heat exchanger or similar device provided with spring members for retaining the gasket in place in accordance with the invention. The face 10 of the female flanged member 11 contains bolt holes 12 and a gasket recess 13 within which gasket 14 is positioned. The corresponding male flange member 15 does not appear in FIG. 1 but is shown in dotted lines in FIG. 2. Typically, flanges for this type of equipment are designed with a three-sixteenth inch deep recess and a normal clearance of one-sixteenth inch between the outer edge of the gasket and the outer edge of the recess. The gasket will normally be one-eighth inch in thickness. It will be understood, of course, that flanged connections of this type are also made in other sizes for use with gaskets of different dimensions and that the invention is not restricted to the particular dimensions recited.

Figure 3:
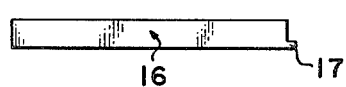
FIG. 3 is an enlarged top view of the spring used in the apparatus of FIGS. 1 and 2.
Figure 4:
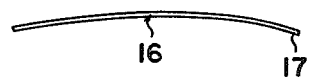
FIG. 4 is a side view of the spring of FIG. 3.

The gasket retainer spring 16 used in the flanged connection of FIGS. 1 and 2 is shown in greater detail in FIGS. 3 and 4 of the drawing. This spring comprises a resilient metallic strip of 302 or 316 stainless steel, brass or similar material which is bowed outwardly in the center and has a tab 17 on one end near the outer edge. The end of the spring opposite the tab is tack welded in place to the wall of the flange recess as shown in FIGS. 1 and 2 so that the spring extends inwardly and the tab projects over the edge of the gasket to hold it in place. For use with a one-eighth inch thick gasket about 36 inches in diameter and designed for a recess clearance of one-sixteenth inch, the spring of FIGS. 3 and 4 will normally be made of stainless steel having a thickness of about 0.02 inch and will be three-sixteenth inch wide and about 1.6 inches in length. The bow at the center of the spring will be about 0.158 inch and the tab may be about one-sixteenth inch long and about one-sixteenth inch wide at the widest point. It will again be understood that these dimensions will depend upon the particular gasket and flange with which the springs are to be used and may be varied as necessary for use with gaskets and flanges of other sizes.

In using the spring retainers of FIGS. 3 and 4, a plurality of the retainers are first tack welded in place on the wall of the gasket recess 13 at approximately equally spaced intervals. The number of springs employed and their disposition should be sufficient to insure that the gasket will be centered in the gasket recess of the flanged member. Normally, at least three retainers are required. After the retainers have been properly installed in the flanged member, the gasket is placed in the gasket recess. Each retainer extends inwardly over a distance greater than the normal clearance between the outer edge of the gasket and the surrounding wall of the recess and hence it will normally be necessary to depress the springs in order to fit the gasket into place. After the gasket has been centered in the recess, the force exerted by the springs against the gasket and the tabs on the springs hold the gasket in the desired position. The gaskets used with this type of equipment are sufficiently stiff that there is no danger of the gasket buckling or falling out of the recess. With the gasket thus positioned in the flange, the mating flange can be moved into position to permit makeup of the connection without danger of the gasket slipping or moving out of position during the makeup operation. The springs are left in place after the connection is made up and normally have no adverse effect upon the performance of the gasket.

Figure 6:
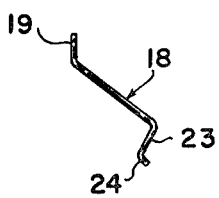
FIG. 6 is an enlarged, isometric view of the spring of FIG. 5.
Figure 5:
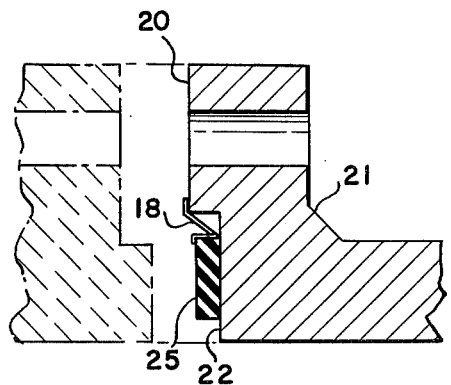
FIG. 5 is an enlarged cross-sectional view of a flanged member illustrating the use of an alternate type spring for purposes of the invention.

FIGS. 5 and 6 illustrate an alternate spring embodiment which may be employed for purposes of the invention. The spring 18 of FIGS. 5 and 6 is made of resilient spring wire and is bent to include an outer shank 19 which is tack welded to the face 20 of flanged member 21 outside the gasket recess 22 as shown in FIG. 5. The shank 19 will normally extend from the main part of the spring at an angle greater than 90°. The other end of the spring is bent to form a section 23 which extends parallel to the outer wall of the recess and a short section 24 extending perpendicular to the outer recess wall. The angle between section 23 and the main part of the spring will normally be somewhat greater than 90 degrees. With the spring tack welded in place on the flange and extending into the recess as shown, section 23 of the spring seats upon the edge of gasket 25 and section 24 prevents outward movement of the gasket from the recess. By mounting a plurality of such springs at spaced intervals around the gasket recess, the gasket can be readily held in place during flange makeup operations without the difficulties which have characterized such operations in the past. It will be understood that the invention is not restricted to the use of the particular spring configurations shown in the drawing and that various other configurations may be employed in lieu of those shown in the drawing. The springs may in some cases be tack welded to the gasket if desired.

I claim:

1. A flanged connection comprising a first flanged member containing an annular gasket recess bounded by a wall formed by said recess in said first member, an annular gasket positioned within said gasket recess and having an outer edge located adjacent said wall, a plurality of resilient metallic gasket retainer springs tack welded to said recess wall in said first flanged member and extending within said recess in contact with said edge of said gasket at spaced intervals about said gasket, a second flanged member aligned with said first flanged member and abutting against said gasket, and means for securing said second flanged member to said first flanged member.

2. A connection as defined by claim 1 wherein said retainer springs extend over the edge of said gasket to hold said gasket in place.

3. A connection as defined by claim 1 wherein said retainer springs are tack welded to said gasket.

4. A connection as defined by claim 1 wherein said retainer springs comprise bowed metallic strips.

* * * * *